United States Patent
Hughes

(10) Patent No.: US 8,001,383 B2
(45) Date of Patent: Aug. 16, 2011

(54) SECURE SERIAL NUMBER

(75) Inventor: Aidan T Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 11/701,232

(22) Filed: Feb. 1, 2007

(65) Prior Publication Data
US 2008/0189549 A1   Aug. 7, 2008

(51) Int. Cl.
*H04L 9/32* (2006.01)
(52) U.S. Cl. ............. 713/171; 713/185; 726/26; 726/30
(58) Field of Classification Search ........................ None
See application file for complete search history.

(56) References Cited

U.S. PATENT DOCUMENTS

| | | | |
|---|---|---|---|
| 5,864,620 A | 1/1999 | Pettitt | |
| 5,905,860 A | 5/1999 | Olsen et al. | |
| 6,023,766 A | 2/2000 | Yamamura | |
| 6,088,516 A * | 7/2000 | Kreisel et al. | 709/221 |
| 6,169,976 B1 * | 1/2001 | Colosso | 705/59 |
| 6,513,121 B1 | 1/2003 | Serkowski | |
| 6,615,352 B2 | 9/2003 | Terao et al. | |
| 6,961,852 B2 | 11/2005 | Craft | |
| 7,278,031 B1 * | 10/2007 | Best | 713/193 |
| 2002/0065781 A1 * | 5/2002 | Hillegass et al. | 705/59 |
| 2002/0091644 A1 * | 7/2002 | Wong et al. | 705/59 |
| 2002/0120726 A1 | 8/2002 | Padole et al. | |
| 2003/0149670 A1 | 8/2003 | Cronce | |
| 2004/0024688 A1 | 2/2004 | Bi et al. | |
| 2004/0039705 A1 * | 2/2004 | Svancarek et al. | 705/51 |
| 2004/0054920 A1 | 3/2004 | Wilson et al. | |
| 2004/0128395 A1 * | 7/2004 | Miyazaki | 709/229 |
| 2004/0143746 A1 * | 7/2004 | Ligeti et al. | 713/185 |
| 2004/0194083 A1 * | 9/2004 | Hindle et al. | 717/174 |
| 2005/0021992 A1 | 1/2005 | Aida et al. | |
| 2005/0049976 A1 | 3/2005 | Yang | |
| 2005/0289072 A1 | 12/2005 | Sabharwal | |
| 2005/0289397 A1 * | 12/2005 | Haruki et al. | 714/38 |
| 2006/0117177 A1 * | 6/2006 | Buer | 713/155 |
| 2006/0212649 A1 * | 9/2006 | Roberts | 711/112 |
| 2006/0224521 A1 | 10/2006 | Lakamp et al. | |
| 2007/0014414 A1 * | 1/2007 | Benedikt | 380/278 |
| 2007/0016787 A1 * | 1/2007 | Benedikt | 713/176 |
| 2007/0043682 A1 * | 2/2007 | Drapkin et al. | 705/71 |

(Continued)

FOREIGN PATENT DOCUMENTS

KR   1020030038995 A   5/2003

(Continued)

OTHER PUBLICATIONS

Morimoto et al., "Microsoft® Windows® Server 2003 Insider Solution," Nov. 26, 2003, Sams, Chapper 11.*

(Continued)

*Primary Examiner* — Michael Pyzocha
*Assistant Examiner* — Luu Pham
(74) *Attorney, Agent, or Firm* — L. Alan Collins; Collins & Collins Incorporated

(57) ABSTRACT

A serial number for a software product is secured with an authenticator value. The authenticator value and the serial number are evaluated entirely by a remote authentication server such that no cryptographic authentication occurs on a local computer on which the software product is being installed. An abbreviated portion of the authenticator value is used for offline authentication.

14 Claims, 7 Drawing Sheets

U.S. PATENT DOCUMENTS

| | | | | |
|---|---|---|---|---|
| 2007/0078775 A1* | 4/2007 | Huapaya et al. | | 705/59 |
| 2007/0078776 A1* | 4/2007 | Wang | | 705/59 |
| 2007/0143228 A1* | 6/2007 | Jorden et al. | | 705/71 |
| 2007/0150299 A1* | 6/2007 | Flory | | 705/1 |
| 2007/0271456 A1* | 11/2007 | Ward et al. | | 713/156 |
| 2008/0104710 A1* | 5/2008 | Jorden et al. | | 726/27 |
| 2008/0141381 A1* | 6/2008 | Walkoe et al. | | 726/28 |

FOREIGN PATENT DOCUMENTS

KR     1020020082064 A     10/2008

OTHER PUBLICATIONS

Microsoft—TechNet, "Technial Detail on Microsoft Product Activation for Windows XP," Aug. 13, 2001, Microsoft, pp. 1-6.*

Cowart et al., "Installation of Windows XP," Dec. 31, 2003, pp. 1-8.*

Dusparic et al., "Mobile Software Licensing", Date: Jul. 3, 2003, https://www.cs.tcd.ie/publications/tech-reports/reports.03/TCD-CS-2003-29.pdf.

Hauser et al., "LTTP Protection—A Pragmatic Approach to Licensing", Date: Jan. 13, 1994, http://citeseer.ist.psu.edu/cache/papers/cs/26758/http:zSzzSzwww.zurich.ibm.comzSzsecurityzSzpublicationszSz.zSz1995zSzHauBau95.pdf/hauser95lttp.pdf.

Jena et al., "Digital Licensing Service for Agents and Web Services", Date: Apr. 2005, http://csce.uark.edu/~cwt/DOCS/2005-01—PAPER—KIMAS-05—Jena-Thompson—Licensing-Service-for-Agents.doc.

Shieh et al., "Optimal Assignment of Mobile Agents for Software Authorization and Protection", http://dsns.csie.nctu.edu.tw/ssp/docs/Optimal%20Assignment%20of%20Mobile%20Agents%20for%20Software%20Authorization%20and%20Protection.pdf.

"International Search Report", Application No. PCT/US2008/052864, Jun. 18, 2008, pp. 10.

* cited by examiner

SECURE SERIAL NUMBER

BACKGROUND

Modern commercial boxed software products are typically delivered as physical media that contains the software code, and an alphanumeric product key. It is common for a software vendor to require its products complete an "activation" process before the full rights associated with the software are enabled for a specific user and/or computer.

The activation process typically involves the transmission of the product key, along with some information identifying the user and/or computer, to an activation clearinghouse (typically the software vendor, but it may be a third party). The software vendor responds with an authorization code enabling access to the rights associated with the software. The software is then licensed.

When software is of significant value, the incentive to produce counterfeit product keys is high. Due to the nature of software, it can be challenging to identify and disallow counterfeits. In an effort to achieve this, the technology applied to product keys has advanced in recent years to include short digital signatures which attempt to prove that the serial number is legitimate.

However, the effectiveness of product keys can only be measured in terms of the time required to fabricate a counterfeit key given knowledge of the system. The advances in CPU processing power are increasingly rendering current techniques ineffective because "key generation" tools exist which can create counterfeit keys based on existing technology within hours or even minutes.

An adequate solution to this problem has eluded those skilled in the art, until now.

SUMMARY

The invention is directed generally at a secure serial number for use in validating software products. In one embodiment, a secure serial number moves the authentication function off of the local computer (on which the software product is being installed) and to a remote authentication server. In another embodiment, the secure serial number includes authentication values that are sized based on how much time a single attempted validation procedure takes.

BRIEF DESCRIPTION OF THE DRAWINGS

Many of the attendant advantages of the invention will become more readily appreciated as the same becomes better understood with reference to the following detailed description, when taken in conjunction with the accompanying drawings, briefly described here.

DETAILED DESCRIPTION OF THE DRAWINGS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Illustrative Systems

The principles and concepts will first be described with reference to a sample system that implements certain embodiments of the invention. This sample system may be implemented using conventional or special purpose computing equipment programmed in accordance with the teachings of this disclosure.

Figure 1:
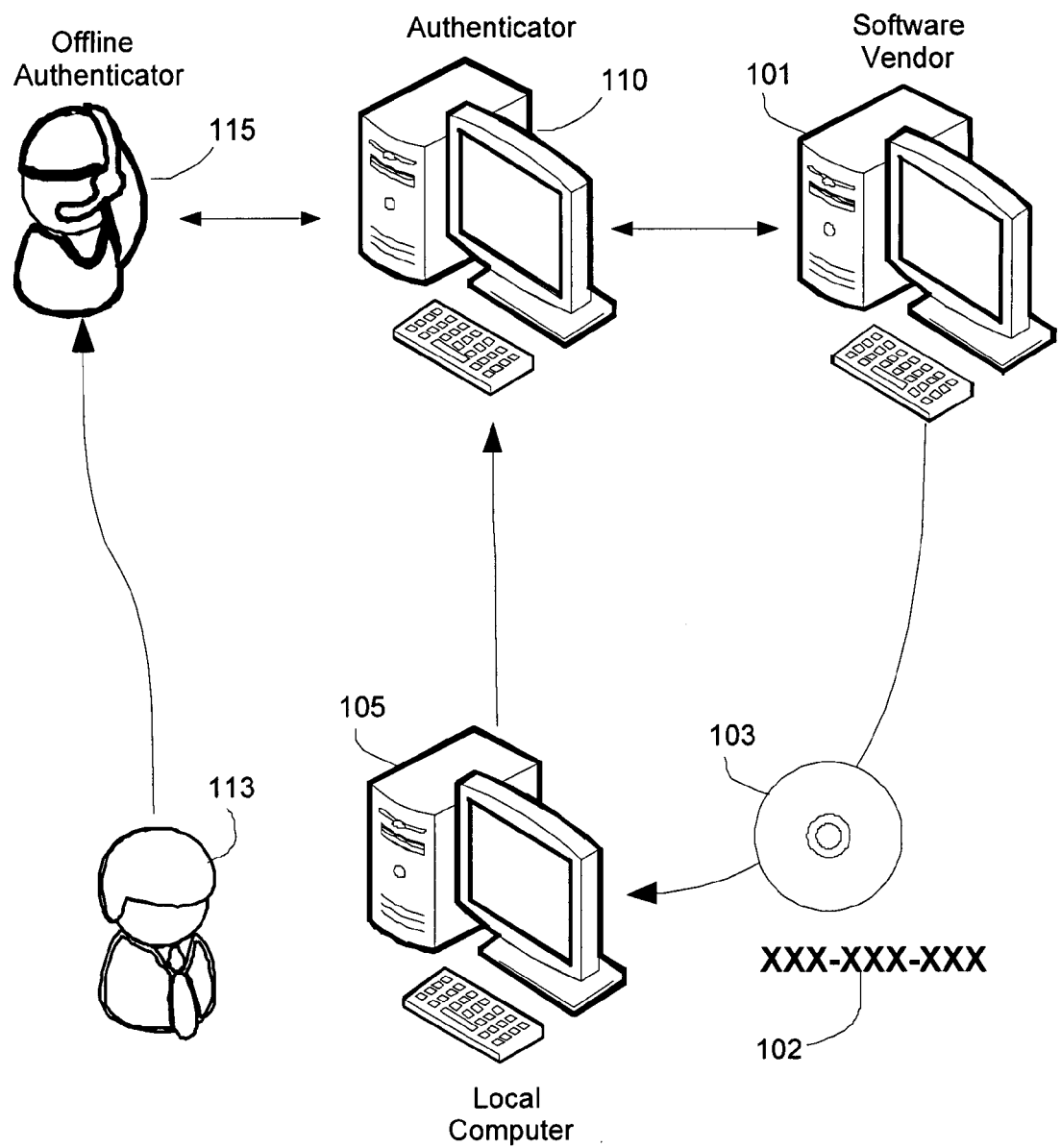
FIG. 1 is a graphical illustration of a computing environment in which embodiments of the invention may be implemented.

FIG. 1 is a graphical illustration of a computing environment 100 in which embodiments of the invention may be implemented. The computing environment 100 may be implemented using any conventional computing devices, such as the computing device illustrated in FIG. 5 and described below, configured in accordance with the teachings of this disclosure. The specific operations performed by each of the components illustrated in FIG. 1 will be described in detail in conjunction with FIGS. 2-5. However, as an overview, the general operations performed by these components will be described in conjunction with FIG. 1.

Figure 2:
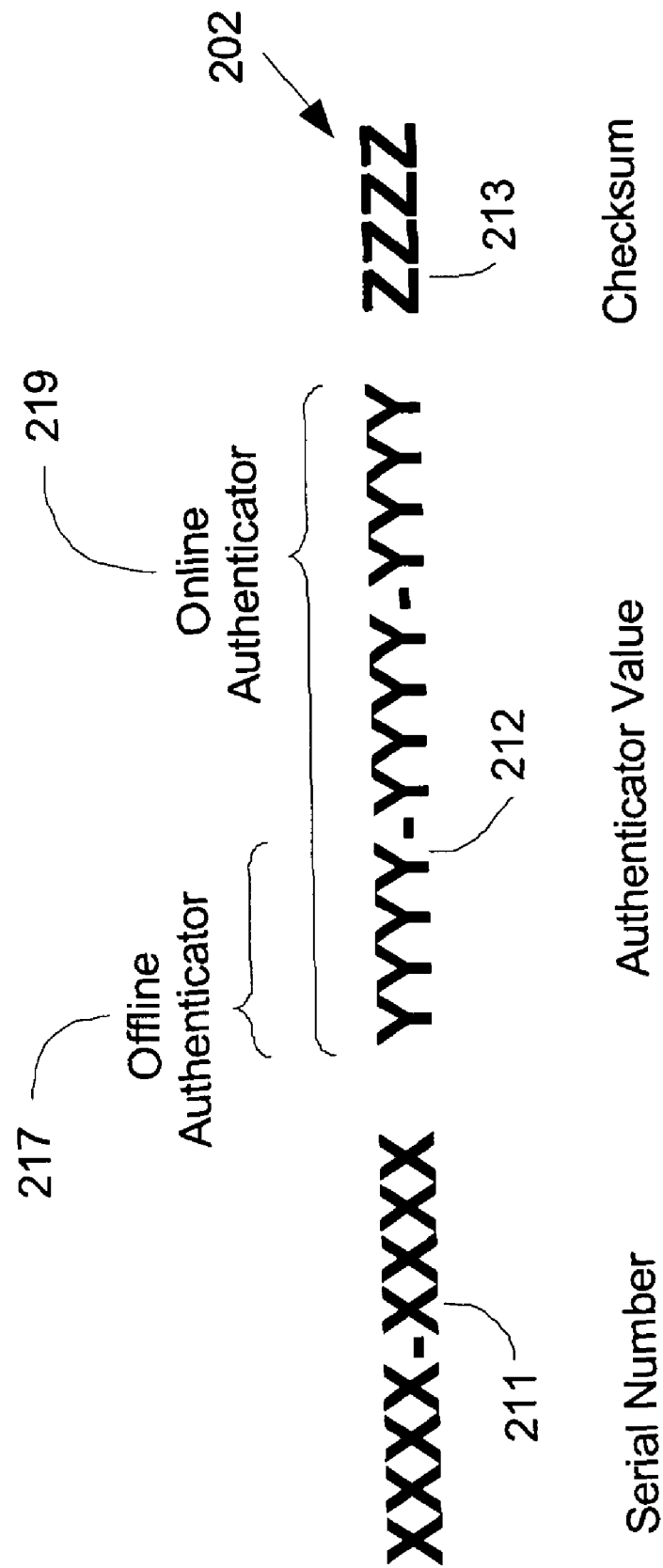
FIG. 2 is a graphical representation of a product key including a secure serial number, in accordance with one embodiment.

The computing environment 100 includes a software vendor 101 that develops and sells or licenses software. In addition, the software vendor 101 includes components to create secure product keys in accordance with one embodiment. More specifically, the software vendor 101 is configured to generate serial numbers for each instance of a software product. In addition, the software vendor 101 is configured to generate an authentication value based on the serial number. The serial number and the authentication value are delivered as a product key 102 with a copy of the software product 103. The product key 102 need not be delivered physically in combination with the software product 103. For instance, the product key 102 could be delivered by electronic message or the like. One specific example of the product key 102 is illustrated in FIG. 2 and described below.

An authenticator 110 is included to perform the task of authenticating the product key 102. The authenticator 110 includes information sufficient to authenticate the authentication value created by the software vendor 101. In addition, the authenticator 110 is configured to generate an activation code for each product key that is successfully authenticated. The activation code (not shown) allows the software product 103 to execute without limitations. The authenticator 110 is illustrated as a separate entity for convenience only. Alternatively, the authenticator 110 could be implemented as a part of or component of the software vendor 101.

A local computer 105 may be any conventional computing system, such as the computing system illustrated in FIG. 5 and described below. The local computer 105 may or may not have online access to other computing systems, such as the authenticator 110. In cases where the local computer 105 does not have online access, the user 113 may perform an offline authentication by communicating with an offline authenticator 115. The offline authenticator 115 may be an agent (e.g., a human or automated telephone operator) of the online authenticator 110.

In operation, the software vendor 101 delivers the software product 103 and the product key 102 to the user 113, who then installs the software product 103 on the local computer 105. As part of the activation process, the software product 103 prompts the user 113 for the product key 102. If the local computer 105 has online access, the software product 103 transmits at least a portion of the product key to the online authenticator 110 for authentication. If the local computer 105 does not have online access, the software product 103 may prompt the user 113 to call the offline authenticator 115 and to provide at least another portion of the product key 102 to the offline authenticator 115. For the purpose of this discussion, the term "offline" means any form of authentication other than an online electronic interaction between the computer on which the product key is being entered (e.g., the local computer 105) and the computer performing the authentication (e.g., the authenticator 110).

A secure product key 102 is one that takes a prohibitively long period of time to "crack," where the term "crack" refers to a systematic or brute force approach to guessing a series of numbers which correlate to a valid product key. Conventional technologies that conduct product key activation perform the authentication on the local computer 105 during the installation process. However, the advancements in computing technology are such that cracking the product key 102 on the local computer 105 is achievable in a relatively short period of time. The inventors have determined that removing the authentication function from the local computer 105 enables the authenticator 110 to control the authentication process, and accordingly how long it would take to guess one valid product key. Consequently, in this embodiment, the product key authentication function has been removed from the local computer 105 and moved to the authenticator 110. In this way, the entire authentication process can be more closely controlled, which avoids the possibility that the authentication process is being thwarted by a brute force key generation attack occurring on the local computer 105.

Referring now to FIG. 2, a sample product key 202 in accordance with one embodiment is illustrated. In this particular implementation, the product key 202 is composed of three parts: a serial number 211, an authenticator value 212, and a checksum 213. It should be noted that the product key 202 described here is but one implementation of many that are possible, and the teachings of this disclosure will apply equally to other product keys of various incarnations and fabrications.

The serial number 211 may be any unique number used to identify individual instances of a software product. Accordingly, the serial number 211 may be one number in a series of linearly increasing values. Alternatively, the serial number 211 could be a randomly chosen number from a group of possible values. In short, the serial number could be any number selected using any acceptable criteria for numerical selection. In one specific example, the serial number 211 is a value approximately 40 bits in length, although other length values are equally applicable.

The authenticator value 212 is a value based on the serial number 211 and a secret, such as a secret key. In one example, the authenticator value 212 could be a hash variant, such as a hash value based on the SHA1 hash algorithm, or the like. The resultant hash value could be truncated to an appropriate length. In another example, the authenticator value 212 could be an encryption variant, such as a value generated using the RC4 stream cipher algorithm on the serial number 211 in combination with a secret key, again truncated to an appropriate length. In still another example, the authenticator value 212 could be merely a completely random unique number that is only associated with the serial number 211 through a separate association, such as a remote database. Generally stated, the authenticator value 212 is a unique value that correlates to the serial number 211 in a manner that is only known to a remote authenticator. In one specific example, the authenticator value 212 is a value approximately 48 bits in length, although other length values are equally applicable.

After extensive efforts, the inventors have determined that the length of time to crack the product key 202 is dependent on whether the authentication is performed online or offline. For instance, a single attempt to validate the product key 202 online may take only moments, which would enable possibly tens of thousands of attempts in a day. Conversely, a single attempt to authenticate the product key 202 offline, such as by human conversation over a telephone, could take several minutes, thus allowing drastically fewer attempts in a day.

Given this determination, an acceptable authenticator value 212 for use with online authentication may be significantly more complex than one for use with offline authentication. And conversely, a significantly simpler authenticator value 212 may be used with offline authentication than with online authentication. But to avoid creating multiple authenticator values, the inventors have determined that one authenticator value 212 can be used in the product key 202, but that only a portion of it (offline authenticator 217) should be used for offline authentication and the entire authenticator value 212 should be used for online authentication (online authenticator 219). In one specific example, the offline authenticator 217 is a value approximately 15 bits in length, although other length values are equally applicable.

This feature shortens the number that a user performing an offline authentication, such as by telephone call, must recite during conversation. This reduces the human error that could cause an invalid authentication. Plus, as mentioned, the length of time a user must spend to perform an offline authentication over the telephone effectively prevents a brute force attempt to guess a valid product key.

In this particular implementation, the initial several characters of the authenticator value 212 are used as the offline authenticator 217. In other implementations, any other portion of the authenticator value 212 could be used, such as a portion in the middle or at the end of the authenticator value 212. It should be noted that as long as the technique for generating the authenticator value 212 results in randomness evenly distributed over the entire authenticator value 212, no disproportionate loss in randomness would be realized from selecting a contiguous series of characters from the authenticator value 212 rather than a scattered selection of characters.

In this implementation, a checksum value 213 is included in the product key 202. The checksum value 213 could be calculated as a checksum of the serial number 211 and the authenticator value 212. In this way, prior to performing the actual authentication, a local process could compute the checksum to detect whether the user incorrectly entered the product key 202. This would avoid authentication failures do to improperly entered product keys, which can be very frustrating for users. In one specific example, the checksum value 213 is a value approximately 32 bits in length, although other length values are equally applicable.

Figure 3:
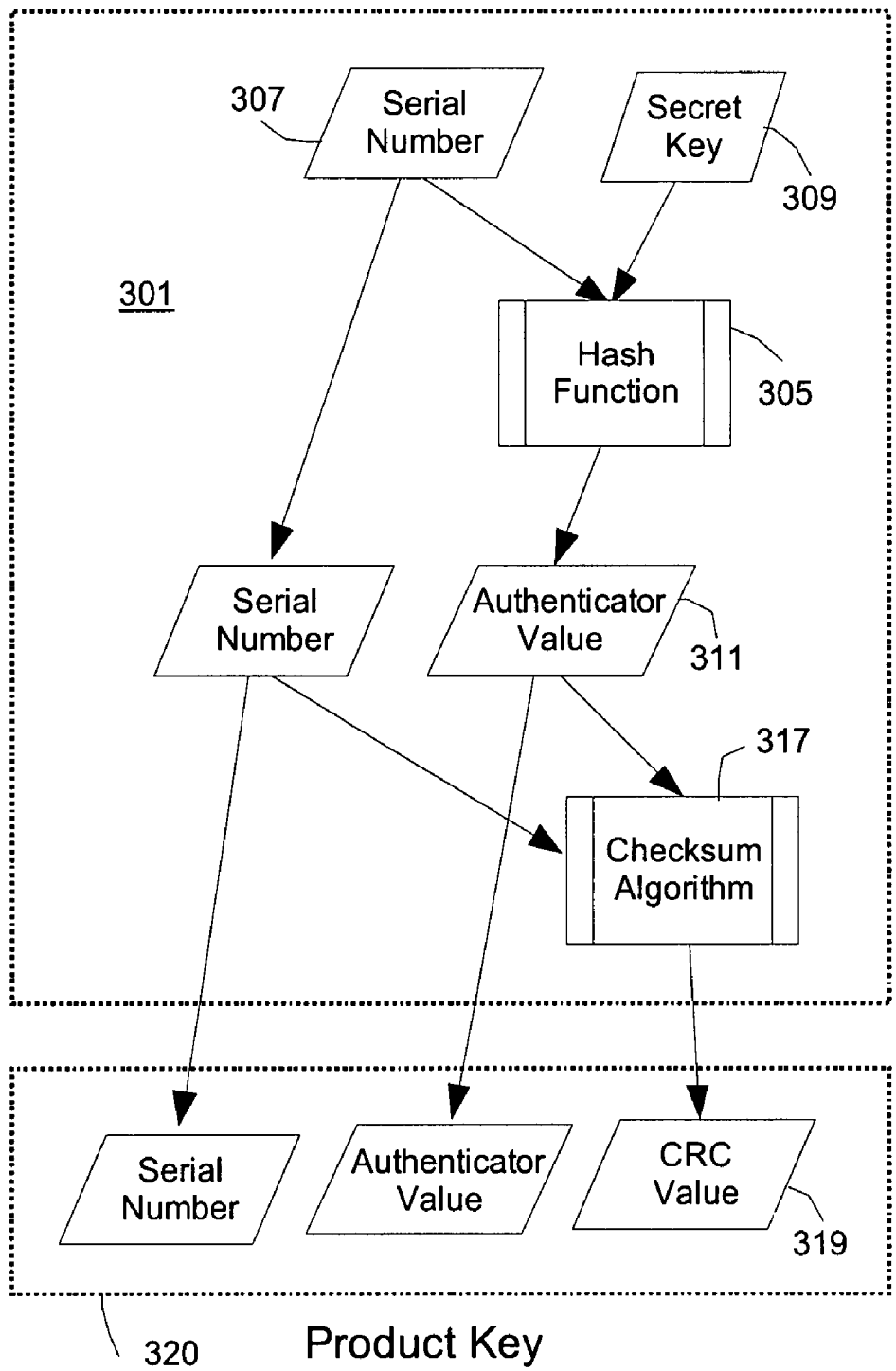
FIG. 3 is a graphical depiction of a software vendor in the creation of a secure product key.

FIG. 3 is a graphical depiction of a software vendor 301 in the creation of a secure product key 305. FIG. 3 illustrates certain functional components that may be embodied as computer-executable instructions resident on software vendor computing hardware. It should be appreciated that many other components may also be present that are unrelated to this embodiment. Additional components may also be implemented to perform additional functions over and above those described here, without deviating from the spirit of this embodiment.

Shown in FIG. 3 is a software vendor 301 including a hash function 305 and a checksum algorithm 317. The hash function 305 represents one of many various mechanisms for encoding data in such a manner that it cannot be easily decoded or evaluated without knowledge of at least a portion of the data that was encoded. In this particular embodiment, the hash function 305 encodes a serial number 307 together with a secret key 309 to achieve an authenticator value 311. Generally stated, a key is a piece of information that controls the operation of a cryptography algorithm. In this particular embodiment, the secret key 309 may be any unique value that is known only to the software vendor 301. The longer or more complex the secret key 309 is, the more difficult it becomes to decode the encoded data. Accordingly, the length of the secret key 309 should be selected to provide a reasonable degree of difficulty to those attempting to crack the authenticator value 311. A four kilobit (4,096 bit) secret key 309 should provide an acceptable degree of strength, although the length of the secret key 309 may be influenced by the particular hash algorithm (or the like) used and other factors. Shorter or longer secret keys may be appropriate in other circumstances.

The software vendor 301 may additionally use a checksum algorithm 317 (or the like) to generate a cyclic redundancy check (CRC) value 319 of the serial number 307 and the authenticator value 311. The checksum algorithm 317 represents any one of many functions for computing a value that may be used to detect if an error exists in another value. Although technically, the checksum algorithm 317 is a hash function, as is the hash function 305 used to create the authenticator value 311, the checksum algorithm 317 is not sufficiently complex to create a value that cannot be easily cracked, and thus is ineffective for use to secure the serial number 307. However, the checksum algorithm 317 is very helpful to detect simple errors, such as product keys that are mis-typed.

The final result is a product key 320 composed of three components: the serial number 307, the authenticator value 311, and the CRC value 319. The product key 320 can then be delivered in combination with a copy of a software product (not shown). It should be appreciated that the product key 320 need not necessarily be physically delivered together with the software product, but rather could be delivered separately, such as through the mail, e-mail, telephone, other electronic communication, or the like.

It should also be appreciated that a different product key 320 may be used for each unique authentic copy of the software product, or not. In other words, the software vendor 301 could choose to assign a particular serial number to up to a given number of software products, such as in the case where a customer purchases a large site license for a large number of installed copies of the software product. Similarly, different product keys 320 may be associated with different versions of the software product.

Figure 4:
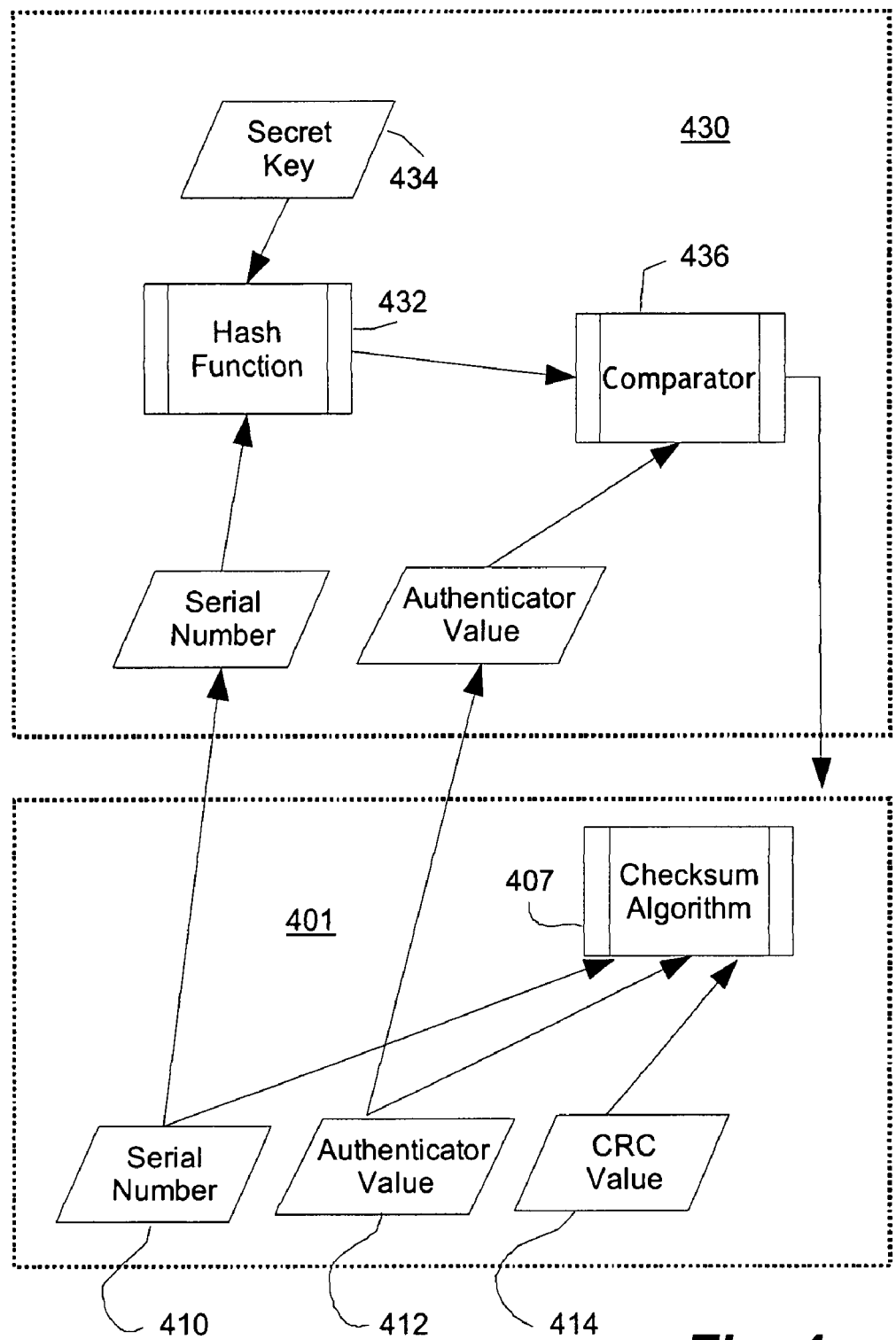
FIG. 4 is a graphical depiction of a local computer and an authenticator in the authentication of a product key.

FIG. 4 is a graphical depiction of a local computer 401 and an authenticator 430 in the authentication of a product key 402. In this particular embodiment, the local computer 401 represents components of a computing system on which a software product is being installed. The local computer 401 includes, in this embodiment, a checksum algorithm 407 sufficient to perform a common mathematical operation for determining if an error exists in a data series. The checksum algorithm 407 is optional and may be omitted in other embodiments.

As part of the activation process, the user is requested to enter (e.g., type in) a product key 402. The product key 402 includes a serial number 410, an authenticator value 412, and a CRC value 414. As described in detail above, the serial number 410 is any number associated with a software product, the authenticator value 412 is a unique value that corresponds to the serial number 410 in a manner that is known only by the authenticator 430, and the CRC value 414 is a simple checksum of the serial number 410 and the authenticator value 412 for error detection. The CRC value 414 may be omitted in other embodiments.

The local computer 401 is in communication with an authenticator 430. In some implementations the local computer 401 and the authenticator 430 are in online electronic communication, such as over a network like the Internet. In other implementations, communication between the local computer 401 and the authenticator 430 occurs through an offline intermediary, such as a human being. In one example, a user may communicate over the telephone with an agent (either human or automated) of the authenticator 430.

As part of an authentication process, the local computer 401 communicates the serial number 410 and the authenticator value 412 to the authenticator 430. It will be appreciated that less than the entire authenticator value 412 may be communicated to the authenticator 430 in certain circumstances, such as during offline authentication. The entire authenticator value 412 may be used for online authentication.

The authenticator 430 includes at least a hash function 432, which represents one of many various mechanisms for decoding data that has been encoded in such a manner that it cannot be easily decoded or evaluated without knowledge of at least a portion of the data that was encoded. In this particular implementation, a secret key 434 represents secret data that was used to encode the authenticator value 412, and as such is necessary to evaluate the authenticator value 412.

The hash function 432 computes a valid authenticator value using the secret key 434 and the serial number 410 and outputs it to a comparator 436, which may be any function for comparing two sets of data. The authenticator value 412 from the local computer 401 is also provided to the comparator 436, which compares it to the output of the hash function 432. The authenticator 430 returns an appropriate indication to the local computer 401 based on the comparison of the hash function 432 output to the authenticator value 412. For example, if the comparison is positive, the authenticator 430 may return an authorization code (not shown) that the local computer 401 uses to indicate that the software product is licensed and authorized for unlimited use. If the comparison is negative, the authenticator 430 may return a failure to the local computer 401, which could disable the software product or allow it to execute for a limited time, or with limited functionality, or both.

Figure 5:
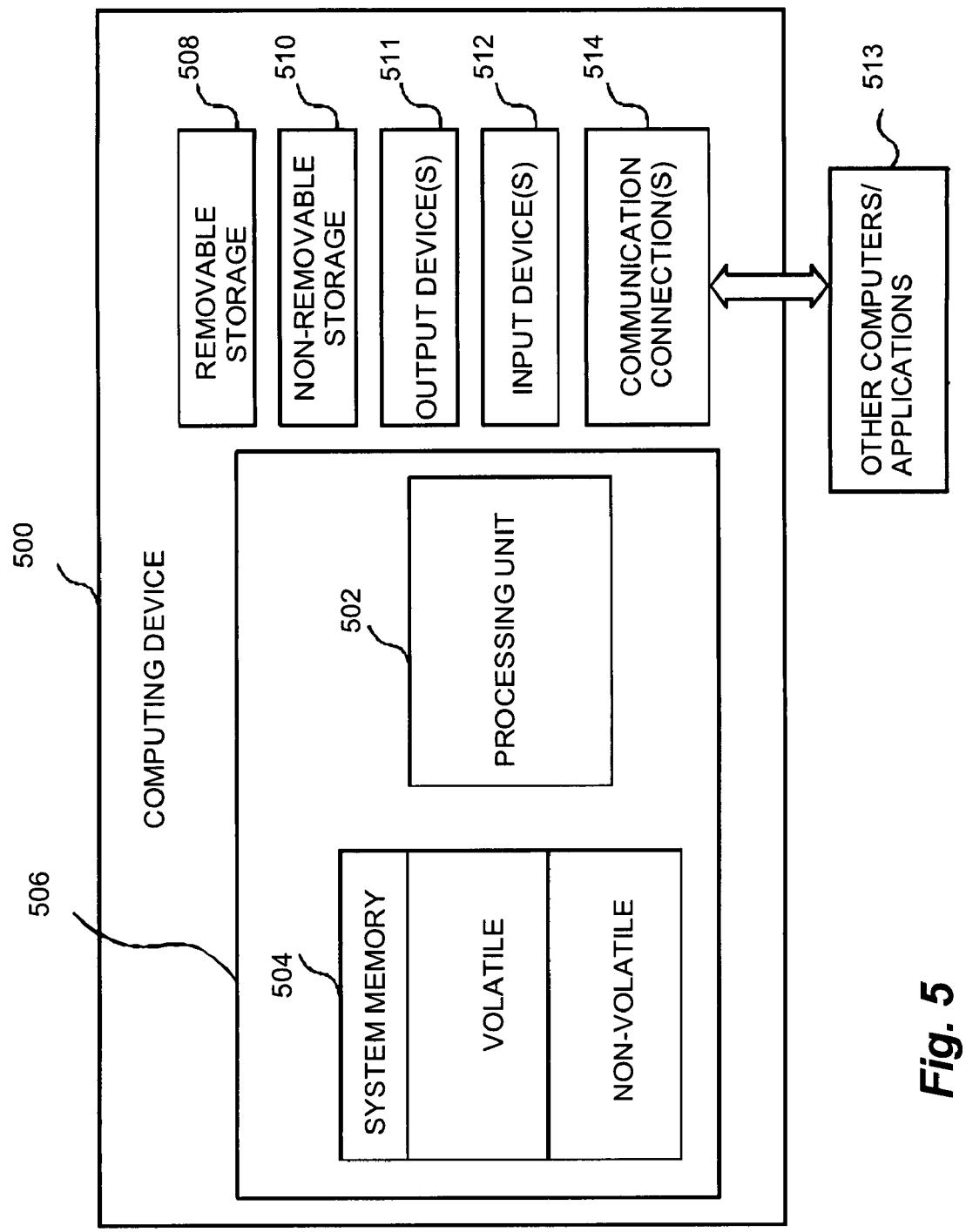
FIG. 5 is a functional block diagram of an exemplary computing device that may be used to implement one or more embodiments of the invention.

FIG. 5 is a functional block diagram of an exemplary computing device 500 that may be used to implement one or more embodiments of the invention. The computing device 500, in one basic configuration, includes at least a processor 502 and memory 504. Depending on the exact configuration and type of computing device, memory 504 may be volatile (such as RAM), non-volatile (such as ROM, flash memory, etc.) or some combination of the two. This basic configuration is illustrated in FIG. 5 by dashed line 506.

Additionally, device 500 may also have other features and functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with one or more computers and/or applications 513. Device 500 may also have input device(s) 512 such as a keyboard, mouse, digitizer or other touch-input device, voice input device, etc. Output device(s) 511 such as a monitor, speakers, printer, PDA, mobile phone, and other types of digital display devices may also be included. These devices are well known in the art and need not be discussed at length here.

Illustrative Processes

The principles and concepts will now be described with reference to sample processes that may be implemented by a computing device, such as the computing device illustrated in FIG. 5, in certain embodiments. The processes may be implemented using computer-executable instructions in software or firmware, but may also be implemented in other ways, such as with programmable logic, electronic circuitry, or the like. In some alternative embodiments, certain of the operations may even be performed with limited human intervention. Moreover, the processes are not to be interpreted as exclusive of other embodiments, but rather are provided as illustrative only.

Figure 6:
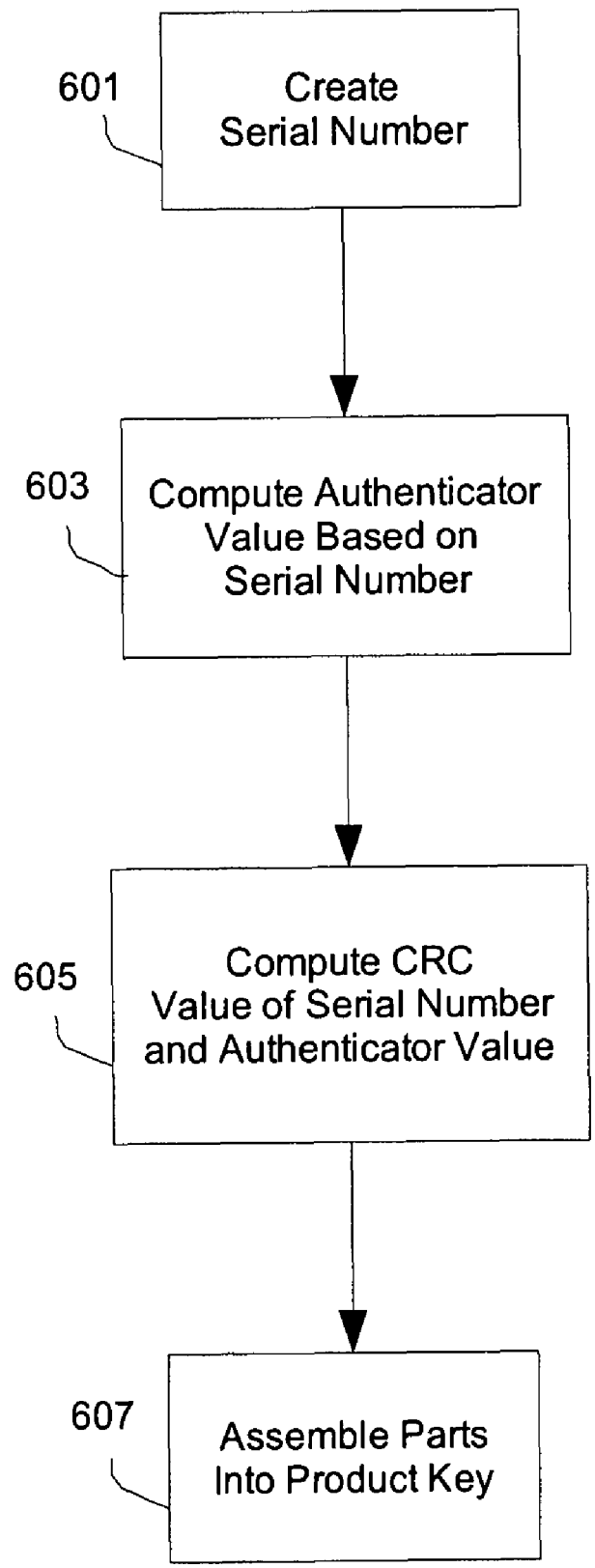
FIG. 6 is an operational flow diagram generally illustrating a process for creating a product key, in accordance with one embodiment.

FIG. 6 is an operational flow diagram generally illustrating a process 600 for creating a product key, in accordance with one embodiment. The product key created can be used to validate or authorize software products. The product key created could take any one or more of multiple physical forms, such as a number printed on a card or paper, a value stored in a database, or the like.

At block 601, a serial number is created for a unique instance of a software product. The unique instance may be one particular copy of the software product, it may be a related group of instances, it may be a series of identified instances of the software product, or the like. The serial number may take any desired form, such as one number in a series of numbers, a random number, or any other value that can be associated with a product, such as the software product.

At block 603, an authenticator value is created based on the serial number and a secret. The authenticator value may be created using any appropriate technique for generating one value based on another value in combination with a secret. In one particular implementation, the authenticator value may be generated using a hash function in combination with a secret cryptographic key. Other examples are also possible, such as an encryption algorithm.

At block 605, optionally, a checksum value (e.g., a CRC value) may be computed on the serial number and the authenticator value. The CRC value may be used to identify errors in the authenticator value and the serial number.

At block 607, each of the constituent parts (e.g., the serial number, the authenticator value, and the checksum value) are assembled in to a product key. At that point, the product key may be delivered in combination with or in conjunction with a new software product.

Figure 7:
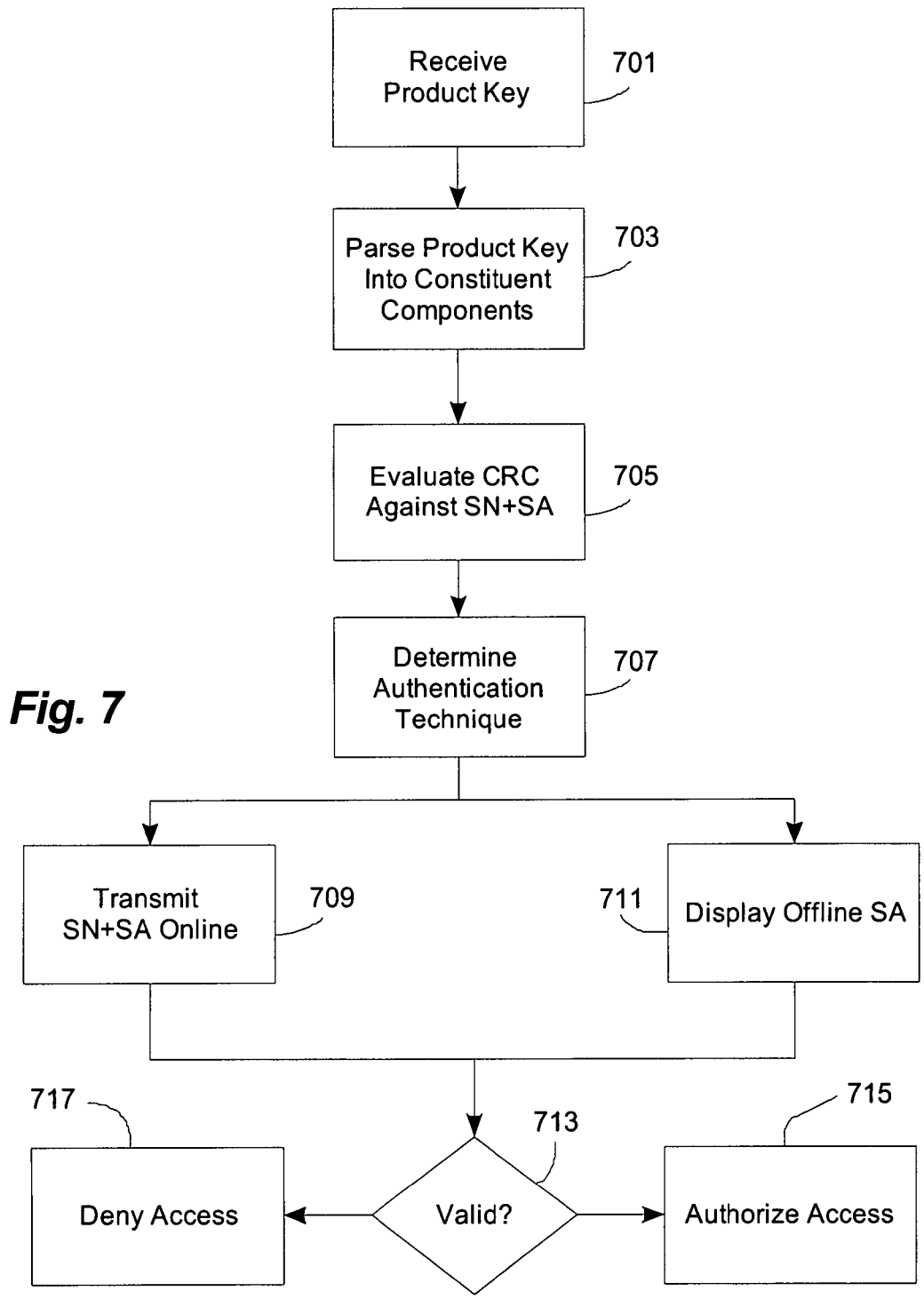
FIG. 7 is an operational flow diagram generally illustrating a process for authenticating a product key, in accordance with one embodiment Embodiments of the invention will now be described in detail with reference to these Figures in which like numerals refer to like elements throughout.

FIG. 7 is an operational flow diagram generally illustrating a process 700 for authenticating a product key, in accordance with one embodiment. The process 700 may be implemented on a local computer system on which a software product is being installed. The process 700 may be performed as part of an authentication or validation procedure of the software product.

At block 701, a product key is received. The product key may be received in response to a prompt for the product key, such as a dialog box presented by an activation process. In another implementation, the product key may be provided programmatically, such as by electronic messaging or communication means.

At block 703, the product key is parsed into its constituent components. In one implementation, the constituent components include at least a serial number and an authenticator value. The serial number is a unique value associated with the software product being installed. The authenticator value is a value encoded in such a manner that it cannot be easily evaluated without knowledge of a secret. The product key may additionally and optionally include a CRC value, which is a checksum of the serial number and the authenticator value.

At block 705, if the product key includes a CRC value, that CRC value is evaluated against the serial number and the authenticator value to determine if there was an error in entry of either value. For example, if a user manually typed in the product key into a dialog box entry field, the possibility for human error is significant. Accordingly, the CRC value, if present, would enable a simple check to avoid such errors. If the product key does not include such a CRC value, then this operation may be omitted.

At block 707, the authentication technique to use to validate the product key is determined. In this particular embodiment, authentication may be performed either online or offline. Online refers to an authentication procedure using electronic communications occurring between two computing systems that are coupled over a network. Offline refers to any authentication procedure which is not online. If the authentication technique is online authentication, the process 700 proceeds at block 709. If the authentication technique is offline authentication, the process 700 proceeds at block 711.

At block 709, the serial number and the authenticator value are transmitted to a remote authentication server. The remote authentication server is configured with the necessary componentry to evaluate the authenticator value against the serial number. In one example, the remote authentication server may include the appropriate algorithms and secret keys to determine if the authenticator value is valid based on the serial number. In this particular implementation, the entire authenticator value is transmitted to the remote authentication server. The entire authenticator value may be a lengthy stream of bits that would be exceedingly difficult to crack even using automated techniques.

At block 711, an offline authenticator value is displayed for use in offline authentication. In this embodiment, it is understood that the process of cracking the authenticator value would still be time prohibitive using a significantly shorter authenticator value than that used for online authentication. Accordingly, the offline authenticator value displayed at block 711 may be an abbreviated or truncated version of the entire authenticator value. The length of the offline authenticator value may be selected based on an estimated length of time for a single attempt to authenticate the authenticator value using the offline authentication technique. Using the offline authenticator value rather than the entire authenticator value for offline authentication reduces the frustration felt by customers attempting to read a lengthy and cryptic number to a telephone authentication agent, for example.

At block 713, a notification is received whether the authenticator value (either the online authenticator or the offline authenticator, depending on the situation) is valid. The notification can take any one of many forms, such as a returned validation code that is stored in conjunction with the software product to verify validity and activation. If the notification is positive, then at block 715 appropriate access is authorized for the software product. Alternatively, if the notification is negative, then at block 717, access to the software product is denied or limited, such as in time or in functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for activating an instance of a software product, comprising:
 receiving, by a computer, a product key comprising constituent components that include a serial number, an authenticator value, and a checksum, wherein the serial number uniquely identifies the instance of the software product, and wherein the authenticator value correlates to the serial number in a manner known only to an authenticator, and wherein the authenticator value was previously generated by hashing the serial number with a secret key, and wherein at least a portion of the authenticator value is considered an offline authenticator value, and wherein the checksum was previously calculated from the serial number and the authenticator value;
 parsing, by the computer, the received product key into its constituent components that include the serial number, the authenticator value that includes the offline authenticator value, and the checksum;
 determining, by the computer and based on the parsed checksum, that the parsed product key does not include an error;
 transmitting, in response to a determination to perform online authentication, the parsed serial number and the parsed authenticator value to the authenticator that is configured to receive and validate the received authenticator value based on the received serial number and the secret key;
 displaying, in response to a determination to perform offline authentication, the parsed offline authenticator value that is subsequently provided to an offline authenticator that receives and validates the received offline authenticator value;
 receiving, in response to the validated authenticator value or the validated offline authenticator value, a notification; and
 authorizing, in response to the notification being positive, access to the instance of the software product.

2. The method recited in claim 1, wherein the serial number comprises a unique value associated with the instance of the software product.

3. The method recited in claim 1, wherein the authenticator value comprises a value derived from an encryption algorithm applied to the serial number and a secret key.

4. The method recited in claim 1, wherein the offline authenticator is a human when performing offline authentication.

5. The method recited in claim 1, wherein the authenticator is a server when performing online authentication.

6. At least one computer-readable storage device storing computer-executable instructions that, when executed by a computer, cause the computer to perform a method for activating an instance of a software product, the method comprising:
 receiving, by a computer, a product key comprising constituent components that include a serial number, an authenticator value, and a checksum, wherein the serial number uniquely identifies the instance of the software product, and wherein the authenticator value correlates to the serial number in a manner known only to an authenticator, and wherein the authenticator value was previously generated by hashing the serial number with a secret key, and wherein at least a portion of the authenticator value is considered an offline authenticator value, and wherein the checksum was previously calculated from the serial number and the authenticator value;
 parsing, by the computer, the received product key into its constituent components that include the serial number, the authenticator value that includes the offline authenticator value, and the checksum;
 determining, by the computer and based on the parsed checksum, that the parsed product key does not include an error;
 transmitting, in response to a determination to perform online authentication, the parsed serial number and the parsed authenticator value to the authenticator that is configured to receive and validate the received authenticator value based on the received serial number and the secret key;
 displaying, in response to a determination to perform offline authentication, the parsed offline authenticator value that is subsequently provided to an offline authenticator that receives and validates the received offline authenticator value;
 receiving, in response to the validated authenticator value or the validated offline authenticator value, a notification; and
 authorizing, in response to the notification being positive, access to the instance of the software product.

7. The at least one computer-readable storage device recited in claim 6, wherein the authenticator value is an encrypted version of the serial number.

8. The at least one computer-readable storage device recited in claim 6, wherein the offline authenticator is a human when performing offline authentication.

9. The at least one computer-readable storage device recited in claim 6, wherein the checksum value is computed using a cyclic redundancy check algorithm.

10. A system for activating an instance of a software product, the system comprising:
at least one computer, including a processor and a memory storing computer executable instructions that, when executed by the processor cause the computer to perform the steps of:
receiving a product key comprising constituent components that include a serial number, an authenticator value, and a checksum, wherein the serial number uniquely identifies the instance of the software product, and wherein the authenticator value correlates to the serial number in a manner known only to an authenticator, and wherein the authenticator value was previously generated by hashing the serial number with a secret key, and wherein at least a portion of the authenticator value is considered an offline authenticator value, and wherein the checksum was previously calculated from the serial number and the authenticator value;
parsing, by the computer, the received product key into its constituent components that include the serial number, the authenticator value that includes the offline authenticator value, and the checksum;
determining, by the computer and based on the parsed checksum, that the parsed product key does not include an error;
transmitting, in response to a determination to perform online authentication, the parsed serial number and the parsed authenticator value to the authenticator that is configured to receive and validate the received authenticator value based on the received serial number and the secret key,
displaying, in response to a determination to perform offline authentication, the parsed offline authenticator value that is subsequently provided to an offline authenticator that receives and validates the received offline authenticator value;
receiving, in response to the validated authenticator value or the validated offline authenticator value, a notification; and
authorizing, in response to the notification being positive, access to the instance of the software product.

11. The system recited in claim 10, wherein the serial number comprises a unique value associated with the instance of the software product.

12. The system recited in claim 10, wherein the authenticator value comprises a value derived from an encryption algorithm applied to the serial number and a secret key.

13. The system recited in claim 10, wherein the offline authenticator is a human when performing offline authentication.

14. The system recited in claim 10, wherein the authenticator is a server when performing online authentication.

* * * * *